3,007,200
APPARATUS FOR PRODUCING PLASTIC
SHEETING
Hans C. Paulsen, Lexington, Cyril W. Roop, Reading, and Conrad Rossitto, Lawrence, Mass., assignors to B.B. Chemical Co., Boston, Mass., a corporation of Massachusetts
Filed Aug. 28, 1958, Ser. No. 757,716
2 Claims. (Cl. 18—15)

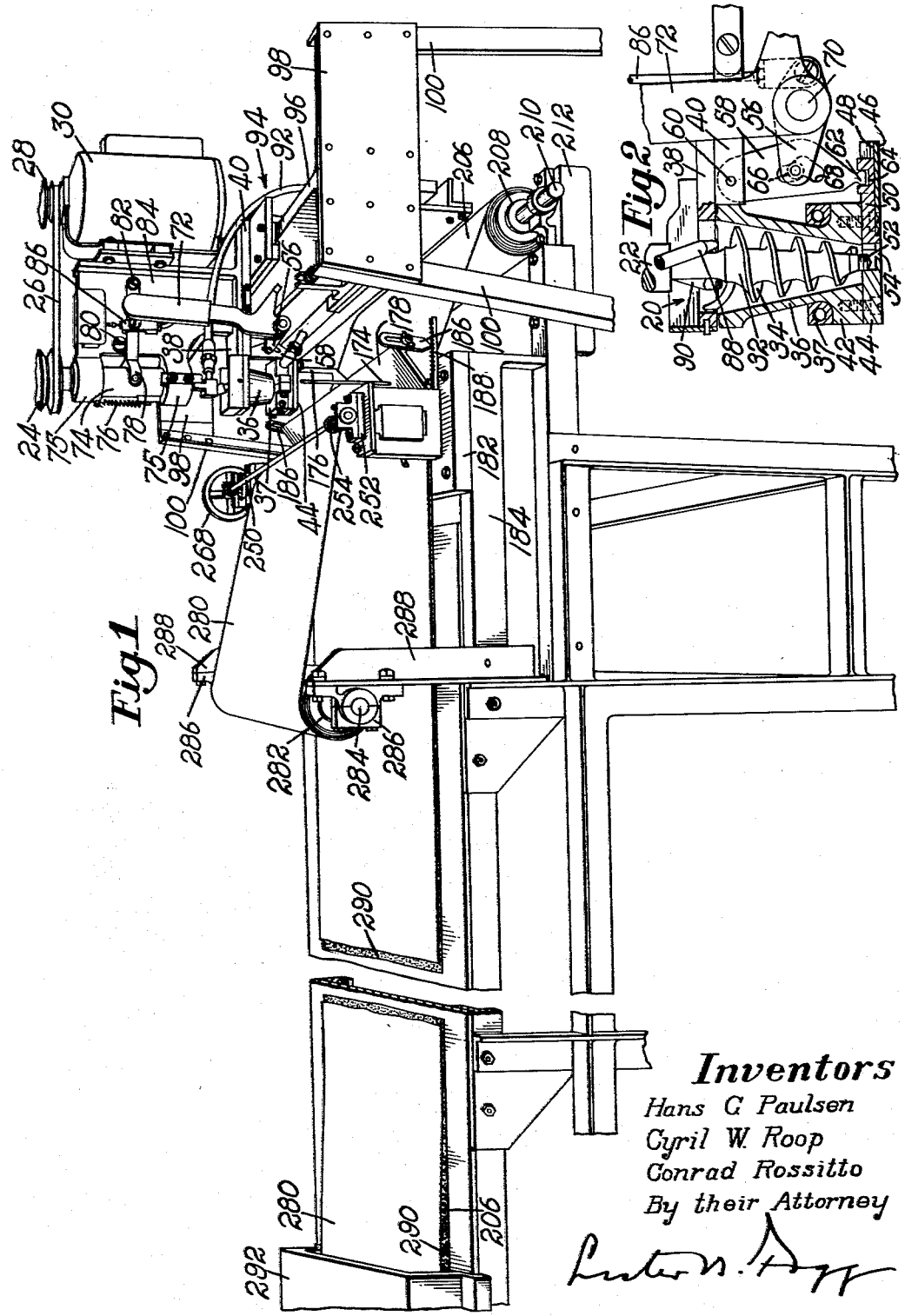

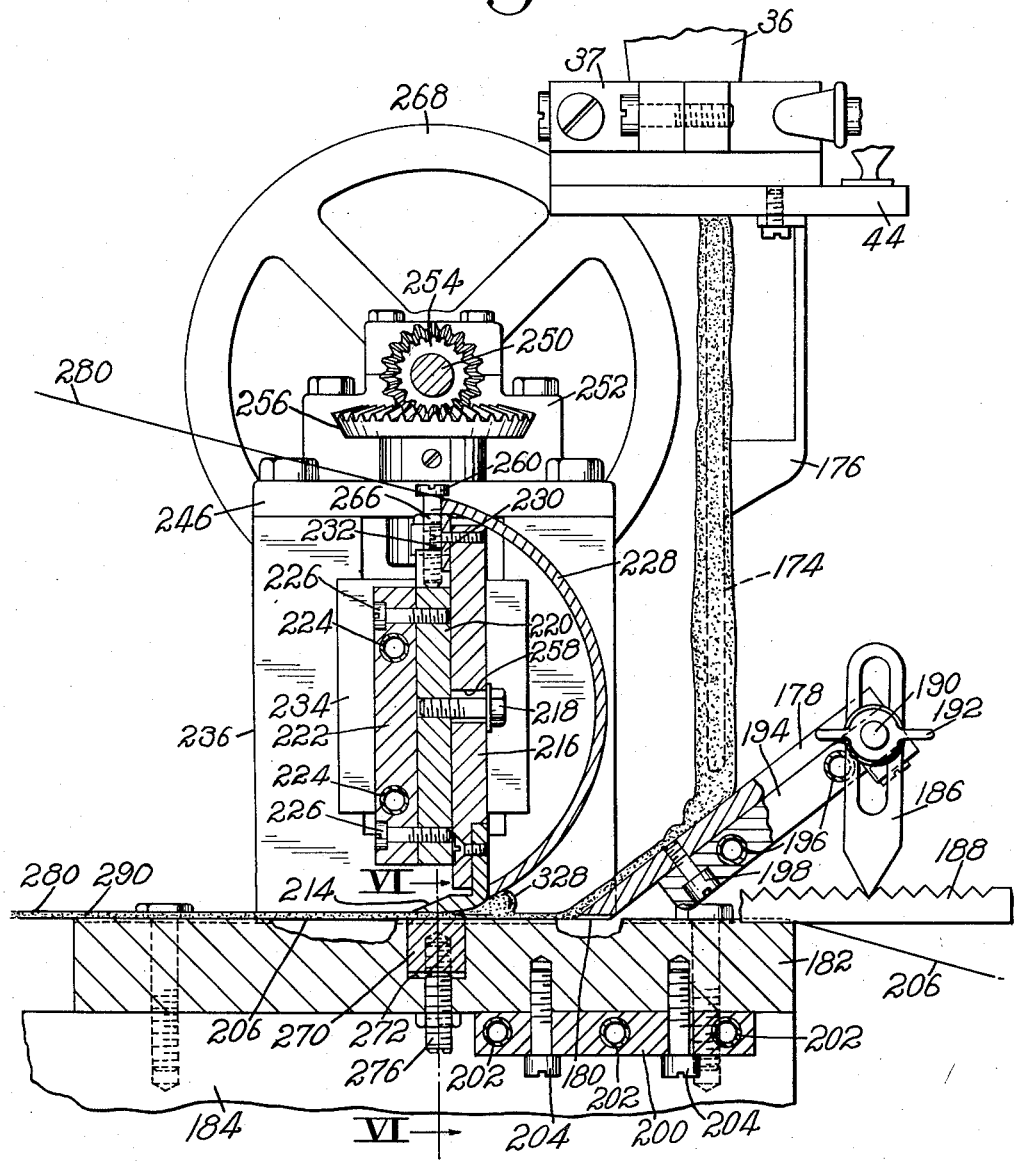

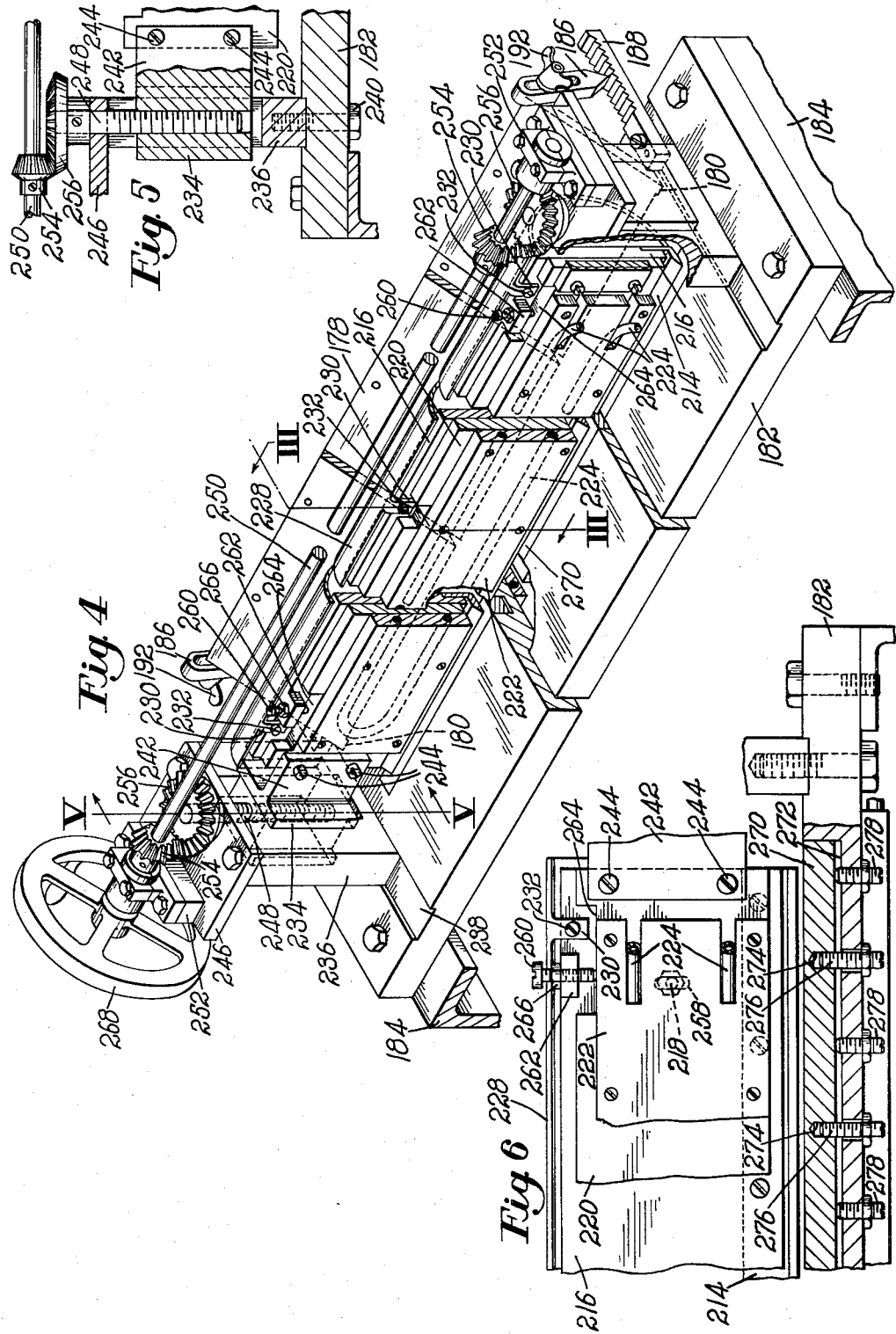

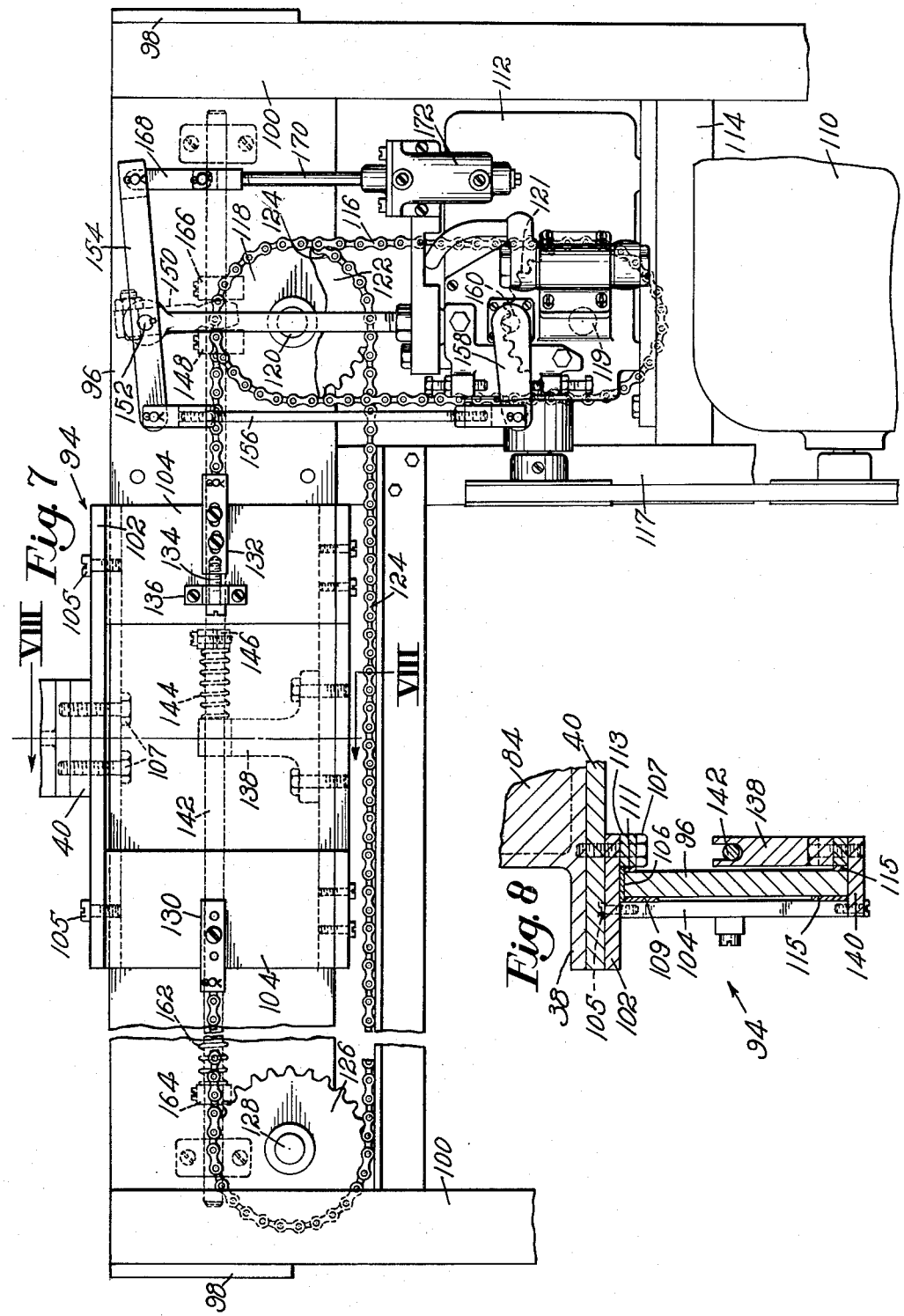

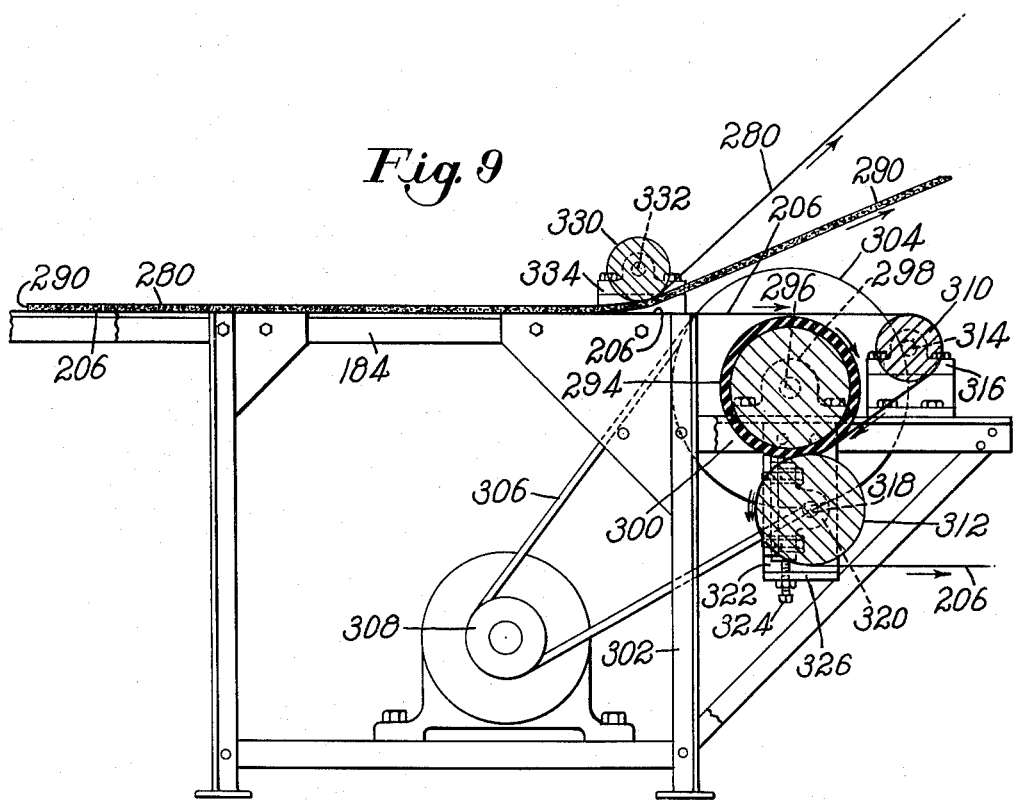

This invention relates to apparatus for use in the manufacture of plastic sheeting, and is herein illustrated in its application to apparatus particularly adapted to the manufacture of cellular plastic sheeting such, for example, as sheeting made of polyurethane foam. An apparatus of this type is disclosed in United States Letters Patent No. 2,956,310, granted October 18, 1960, in the names of Roop and Urban now P.N. 2,956,310.

The utility of polyurethane foam in thin sheet form is well known but heretofore there has been no available apparatus suitable for the production of thin sheet foam on a commercial basis.

It is an object of the present invention to provide apparatus for manufacturing on a commercial scale thin sheet foam of uniform structure and acceptable quality. It is a further object of the invention to provide apparatus of the type above described which is reliable in operation, requires only a minimum of attention and is readily adaptable to handle a wide range of formulations.

With the above and other objects in view, as will hereinafter appear, the present invention consists in the combination of means for dispensing upon a moving conveyor sheet a mixture of fluid components, such for example as a prepolymer and a catalyst, in proportions suitable for the manufacture of polyurethane foam, and a doctor member for spreading the mixture upon the sheet. The doctor member also serves as a means for guiding a blow sheet into contact with the conveyor sheet substantially at the region of the operation of the doctor member. In order to provide for variations in the thickness of the sheet foam the doctor member is mounted for adjustive movement toward and from the conveyor sheet. In order to prevent premature cellular development in the fluid mixture by gasification therein, suitable means is provided for cooling the mixture. The cooling action is continued through the spreading station by the provision of a suitable means for cooling the doctor member. The cooling of the doctor member also serves to cool the blow sheet at its area of contact with the sheet foam.

The illustrated organization is characterized by an ambulatory dispenser which traverses the conveyor sheet widthwise thereof and a flow plate which receives a stream of fluid from the dispenser and discharges the fluid by gravity in a continuous sheet upon the conveyor. Suitable traverse mechanism is provided for causing the dispenser to shuttle back and forth widthwise of the conveyor sheet while fluid in a continuous stream is dispensed therefrom by gravity. In order to reduce to a minimum the impact of the fluid stream upon the flow plate means illustrated in the drawings as a flow rod is provided for retarding the flow of fluid by gravity from the dispenser to the flow plate. The illustrated flow rod is positioned beneath the dispenser in alinement with its discharge port so that the fluid stream follows the flow rod during its passage by gravity from the dispenser to the flow plate.

The invention will now be described with reference to the accompanying drawings and pointed out in the appended claims.

In the drawings,

FIG. 1 is a perspective view with certain parts broken away illustrating apparatus embodying the features of the present invention;

FIG. 2 is a front elevation of a mixing unit illustrated in FIG. 1, largely in section on the axis of the mixing rotor;

FIG. 3 is an enlarged view in front elevation, partly in section on the line III—III of FIG. 4, illustrating a doctor bar assembly and other parts shown in FIG. 1;

FIG. 4 is a perspective view of the doctor bar assembly and other parts, certain parts being broken away to permit shortening of the figure;

FIG. 5 is a section taken on the line V—V of FIG. 4;

FIG. 6 is an enlarged view in side elevation partly in section on the line VI—VI of FIG. 3 illustrating a portion of the doctor bar assembly;

FIG. 7 is an enlarged view in side elevation illustrating the means for mounting the mixing mechanism and for causing it to traverse the width of the sheeting to be produced, certain parts being broken away to permit shortening of the figure;

FIG. 8 is a section taken on the line VIII—VIII of FIG. 7; and

FIG. 9 is a rear elevation illustrating particularly the means for advancing the conveyor belt.

This invention is illustrated in the drawings as embodied in apparatus for use in the manufacture of cellular plastic sheeting. In order to accelerate the curing of the plastci sheet a suitable heating chamber or oven extends along the greater part of the length of the table, the ingress end portion thereof being located a substantial distance from the doctor bar and substantially adjacent to the point at which the activation of the blowing agent commences.

The ambulatory mixing assembly illustrated in the drawings is substantially the same in its construction and operation as a mixing assembly illustrated in United States Letters Patent No. 2,954,214, granted September 27, 1960, in the name of Hans C. Paulsen. Referring to FIG. 2 the illustrated mixing assembly comprises a frusto-conical mixing head 20 of the auger type fixed to the lower end portion of a vertical shaft 22 the upper end portion of which has fixed thereto a cone pulley 24 (FIG. 1) which is connected by a belt 26 to a similar cone pulley 28 on the shaft of an electric motor 30. As shown in FIG. 2, the illustrated mixing head comprises a downwardly tapering hub 32 having formed integrally therewith a helical tongue 34 the edge face of which is common to the frustum of a cone. The mixing head operates in a frusto-conical bowl 36 having the same apex angle as the frustum defined by the edge face of the tongue 34. In order to maintain the components in the mixing bowl 36 at a temperature which will insure against premature activation of the blowing agent a split clamp 37 (FIG. 3), having incorporated therein a passage for the circulation of a coolant, is secured to the lower portion of the mixing bowl. The bowl is arranged in coaxial relation to the mixing head 20 and is secured to a horizontal platform 38 (FIG. 2) fixed to a plate 40. The platform is provided with a circular opening coaxial with the wall of the mixing bowl. Secured to the outwardly flanged bottom portion 42 of the mixing bowl is a base plate 44 having an extension 46 in which is formed a groove 48 which provides a guideway for a sliding gate 50. The groove 48 is extended to the left, as seen in FIG. 2, to bring its end portion into axial alinement with the mixing head 20 and the hub 32 of the mixing head has a threaded stem 52 which extends downwardly into the end portion of the groove and serves as a scraper for eliminating any residue of fluid that may accumulate in the left end portion of the groove in the operation of the mixer. The left end portion of the groove 48 is reduced to a width corresponding to the diameter of the stem 52 and is made semicircular to receive said stem in contiguous relation. Similarly, the left end face of the sliding gate 50 is made semicircular for engagement with the stem 52 when the gate is at the limit of its closing movement. Movement of the gate 50 to the right into its position illustrated in FIG. 2 provides an opening communicating with a discharge port 54 formed in the base plate 44. The gate 50 is operated by a rocker arm 56 arranged to actuate a lever 58 the upper end portion of which is positioned in a notch in the left end portion of the plate 40 and is pivotally mounted on a pin 60 fixed in the plate. The tapered lower end portion of the lever 58 has formed therein a head 62 which operates in a notch 64 formed in the enlarged right end portion of the sliding gate 50. The central portion of the lever 58 is positioned in the bifurcated forward portion of the rocker arm 56 which carries a cross pin 66 extending through a cam slot 68 formed in the lever 58. The arm 56 is fixed to a rock shaft 70 journaled in a yoke (not shown) secured to and depending from the plate 40. Fixed to an end portion of the shaft 70 and projecting upwardly therefrom is a hand lever 72 which is operated to cause the lever 58 alternately to open and to close the opening communicating with the discharge port 54. The shaft 22 is journaled in suitable bearings in a sleeve 74 mounted for endwise sliding movement in cylindrical extensions 75 of a standard 84 extending upwardly from the plate 40. The shaft 22 moves endwise with the sleeve thereby to vary the vertical position of the mixing head 20 in the bowl 36. The assembly comprising the sleeve 74, the shaft 22 and the mixing head 20 is normally held at the limit of its upward movement by a spring 76 (FIG. 1), this position being adjustably determined by the engagement of a lever 78 with the edge face of an eccentric 80 mounted in the standard 84. The elevated position of the mixing head is illustrated in FIG. 2. The lever 78 is pivoted at its right end on a headed screw 82 fixed in the standard 84, the bifurcated left end portion of the lever being pivoted to the sleeve 74. Downward movement is imparted to the mixing head 20 by the operation of the rocker arm 56 which is connected to the lever 78 by a link 86. For conducting the fluids to be mixed into the bowl 36 suitable nozzles 88 and 90 (FIG. 2) are mounted in brackets fixed to the lower extension 75 of the standard 84 and connected to a supply by flexible tubes such, for example, as the tube 92 illustrated in FIG. 1 through which fluid is transmitted by a suitable pump (not shown).

In order to provide for movement of the mixing assembly to cause it to traverse the conveyor belt widthwise thereof, the plate 40 is fixed to a carrier 94 constructed and arranged to travel on a rail 96 the opposite ends of which are secured to cross heads 98 fixed to the upper end portions of legs 100 which in turn are fixed to the floor. Referring to FIG. 8, the illustrated carrier comprises a horizontal plate 102 fixed to vertical plates 104 by screws 105 and to the plate 40 of the mixing assembly by screws 107. The plate 102 has fixed to its bottom surface a wear plate 106 which rides on the upper edge face of the rail 96. Similar wear plates 109 and 111 are arranged perpendicular to the wear plate 106 and secured respectively to the plate 104 and to a bar 113 secured to the plate 102. At its lower extremity the carrier 94 is provided with wear plates 115 which bear against opposite sides of the rail 96. The mixing assembly is shuttled back and forth upon the rail 96 by a chain and sprocket mechanism actuated by an electric motor 110 (FIG. 7) through a reversible speed reduction unit 112 of known construction, both the motor and the speed reduction unit being mounted on a shelf 114 fixed to the legs 100 and to an arm 117 depending from the rail 96. The output shaft 119 of the speed reduction unit has mounted thereon a sprocket wheel 121 which is connected by a chain 116 to a sprocket wheel 118 fixed to a shaft 120 journaled in a bearing member incorporated in the rail 96. Also fixed to the shaft 120 is a sprocket wheel 122 which carries a chain 124 which extends forwardly from the sprocket wheel 122 in parallel relation to the rail 96 and passes around an idle sprocket wheel 126 mounted on a shaft 128. The forward end of the chain 124 is connected by a link 130 to the forward vertical plate 104 of the carrier and the rear end of the chain is connected by a link 132 to a headed adjustment screw 134 mounted in a yoke 136 fixed to the rear plate 104. For changing the direction of movement of the carrier 94 at each end of its run, suitable means is provided for changing the direction of rotation of the output shaft 119 of the speed reduction unit 112. As illustrated in FIG. 8 the reversing mechanism comprises an upstanding arm 138 fixed to the bottom plate 140 of the carrier 94 and having its bifurcated upper end portion arranged to straddle a horizontal shifter bar 142. As the carrier approaches the rearward extremity of its path of movement upon the rail 96 the arm 138 engages the forward portion of a helical spring 144 freely mounted on the shifter bar 142 and arranged to bear against a collar 146 fixed to the shifter bar. Continued movement of the carrier 94 after the arm 138 engages the spring 144 causes the shifter bar 142 to move rearwardly with the carrier. Such rearward movement of the shifter bar causes a collar 148, fixed to the shifter bar and arranged in contiguous relation to an arm 150 fixed to and depending from a shaft 152, to swing the arm 150 and the shaft 152 in a counterclockwise direction into its position shown in FIG. 7. Fixed to the rock shaft 152 is a rocker arm 154 which is connected by a link 156 to an arm 158 secured to a rock shaft 160 in the speed reduction unit 112. The operation of the rock shaft reverses the direction of rotation of the output shaft. Such reversal of the output shaft causes a reversal in the direction of movement of the carrier 94 moving it from right to left, as seen in FIG. 7, until the shifter arm 138 engages a helical spring 162 loosely mounted on the left end portion of the shifter bar 142 in abutting relation to a collar 164 fixed to the bar. The action of the shifter arm 138 against the spring 162 shifts the bar 142 to the left, as seen in FIG. 7, causing a collar 166 fixed to the right end portion of the shifter bar to swing the arm 150 in a clockwise direction thereby rocking the shaft 160 in the speed reduction unit 112 in a clockwise direction to change the direction of rotation of the output shaft 119 and thus to reverse the direction of movement of the carrier 94. The bifurcated right end portion of the rocker arm 154 is connected by a link 168 to the stem 170 of the plunger of a double acting dash pot mechanism operating in a cylinder 172 fixed to the unit 112.

Referring to FIG. 3, the fluid discharged from the bowl 36 flows downwardly in contact with a vertical flow rod 174 formed integrally with a bracket 176 secured to the base plate 44. The flow rod 174 directs the stream of fluid discharged from the bowl 36 downwardly onto a flow plate 178 which is inclined downwardly to the left, as seen in FIG. 3. The length of the flow plate is slightly greater than the width of the conveyor belt and the length of the plate is disposed at right angles to the direction of feed of the belt. Due to its viscosity the contact of the stream of fluid with the flow rod 174 substantially retards the speed of its downward movement and thus substantially eases the impact of the stream with the flow plate 178. For supporting the lower portion of the plate 178 with the plate slightly spaced above the conveyor belt, the plates has feet 180 (FIG. 4) formed at opposite ends thereof for engagement with the upper surface of a crosshead 182 secured to the frame of a table 184. The elevated portion of the flow plate 178 is supported by two legs 186 (FIG. 1) mounted at opposite ends of the flow plate and serving as indexing members for determining the position of the flow plate lengthwise of the conveyor belt relatively to suitably graduated members fixed to the crosshead. As shown in FIG. 3, the lower portion of each leg 186 is tapered to a terminal edge which is seated at the base of one of a succession of V-notches formed in a bar 188 fixed to the crosshead 182 and extending therefrom to the right as seen in FIG. 3. To provide for the angular adjustment of the flow plate 178 each leg 186 is slotted longitudinally to receive a threaded stud 190 carried by the flow plate and a winged clamping nut 192 on the stud 190 serves to secure the leg 186 in adjusted relation to the flow plate 178.

The temperature of the stream of fluid flowing downwardly from the bowl 36 is approximately 35° F. In order to maintain this temperature of the fluid as it flows downwardly upon the plate 178, a cooling plate 194 having incorporated therein, a tube 196 for conducting a suitable coolant is secured by headed screws 198 to the bottom face of the flow plate 178. To the same end a cooling plate 200, having incorporated therein a suitable tube 202, is secured by headed screws 204 to the bottom face of the crosshead 182.

The fluid sheet flows from the plate 178 onto the conveyor belt which, in the illustrated organization, is a length of heavy paper 206 (FIG. 1) which is fed from a roll 208 mounted on a shaft 210 journaled in bearings in suitable extensions 212 of the table 184. In order to prevent undue adhesion of the fluid sheet to the conveyor belt a coating of silicone is provided on the upper surface of the belt.

In order to spread the fluid sheet uniformly and at a predetermined depth upon the conveyor belt 206 a doctor member illustrated in FIGS. 3 and 4 as an angle bar 214 is secured to an upright plate 216 extending across the conveyor belt and spaced from the flow plate 178 in the direction of feeding movement of the belt, or to the left as seen in FIG. 3. The bottom surface of the doctor bar is inclined downwardly in the direction of feed and the upper surface of the horizontal portion of the doctor bar is beveled to an edge, as shown in FIG. 3. The plate 216 which carries the doctor bar is secured by headed screws 218 to a plate 220 to which a cooling plate 222 having incorporated therein a suitable tube 224 is secured by headed screws 226. Attached to the plate 216 is a plate 228 for guiding a blow sheet 280 to the bottom surface of the doctor bar 214. As shown in FIG. 3, the guide plate 228 is arcuate in cross section and has, at its upper extremity, downturned lugs 230 (FIG. 4) which are secured to the upper portion of the plate 216 by headed screws 232. Referring to FIGS. 4 and 5, the plate 220 carries at each end thereof a guide block 234 which is grooved at opposite sides thereof and mounted for vertical sliding movement in a notch or guideway formed in a standard 236 mounted in a groove 238 in the crosshead 182 and secured therein by headed screws 240 (FIG. 5). To provide for the attachment of the guide blocks to the plate 220, each guide block has a flange 242 extending inwardly therefrom and secured to the end portion of the plate 220 by headed screws 244. In order to provide for the vertical adjustment of the doctor bar 214 toward and from the conveyor belt 206 each standard 236 has secured to its upper extremity a horizontal plate 246 which is bored to receive a screw shaft 248 (FIG. 5) which operates in a threaded bore in the block 234 to raise or lower the doctor bar assembly. The two screw shafts are operated simultaneously and at the same speed by the rotation of a horizontal shaft 250 mounted in bearings in suitable journal assemblies 252 fixed to the plate 246 and the corresponding plate at the opposite end of the shaft. To provide for the convenient operation of the shaft 250 a hand wheel 268 is secured to an extended end portion thereof. Fixed to opposite end portions of the shaft 250 are two small bevel gears 254 which mesh with relaitvely large bevel gears 256 secured to the upper end portions of the two screw shafts. In order to permit such angular adjustment of the doctor bar 214 as may be required to space it uniformly from the conveyor belt 206 the screws 218 (FIG. 3) attaching the plate 216 to the plate 220 extend through vertical slots 258 formed in the plate 216. The adjustment of the plate 216 is effected by turning one or the other of two screws 260 (FIG. 4) mounted in ears 262 projecting horizontally from the upper portion of the plate 216 over suitable notches 264 in the plate 220. After the required adjustment has been made the screws 260 are secured in adjusted position by lock nuts 266. The doctor bar 214 registers with a bar 270 (FIG. 6) inserted into a groove 272 in the crosshead 182. The bar 270 is slidable vertically between the walls of the groove 272 to provide a micrometric adjustment of the space between the bar 270 and the doctor bar 214. To this end the bar has formed therein at uniformly spaced points along its length sockets or bores 274 extending upwardly from the bottom surface of the bar and threaded to receive screws 276 extending through suitable bores formed in the crosshead 182 at the base of the groove 272. Cooperating with the screws 276 in the adjustment of the bar 270 are relatively short screws 278 mounted in threaded bores in the crosshead 182 and arranged to bear against the bottom surface of the bar 270. Suitable lock nuts are provided for securing the screws 276 and 278 in adjusted position.

Referring to FIG. 1, the illustrated blow sheet is a length of heavy paper 280 similar to the conveyor belt 206 having a coating of silicone thereon to prevent undue adhesion thereto of the fluid sheet. The blow sheet is drawn from a roller 282 mounted on a shaft 284 mounted to rotate in suitable journal assemblies 286 secured to standards 288 fixed to and projecting upwardly from the table 184. From the roller 282 the blow sheet moves in a direction opposite to the direction of feed of the conveyor belt to the guide plate 228. Referring to FIG. 3, the blow sheet passes downwardly upon the guide plate and thence in the direction of feed of the conveyor belt in contiguous relation to the bottom surface of the doctor bar 214 and in intimate contact with the upper surface of the fluid sheet, which is identified in FIG. 3 by the numeral 290. While no permanent bond is established between the blow sheet 280 and the fluid sheet 290 the blow sheet adheres sufficiently to the fluid sheet to cause it to be conducted upon the table 184 in unison with the fluid sheet and the conveyor belt by feed movement imparted to the conveyor belt by mechanism now to be described.

Referring to FIG. 9, the conveyor belt 206 is drawn or fed along the surface of the table 184 by a rubber faced feed roll 294 fixed to a shaft 296 mounted to rotate in suitable journal assemblies 298 fixed to a shelf 300 mounted on legs 302 at the egress end of the table. Also secured to the shaft 296 is a large pulley 304 which is actuated by a belt 306 driven by a power actuated pulley 308. From the egress end of the table the conveyor belt 206 moves horizontally to a guide roll 310, passing from the guide roll downwardly into contact with the feed roll 294 and between the feed roll and a pressure roll 312 from which it advances to a suitable roller (not shown) on which it is rewound for re-use. The guide roll 310 is mounted on a shaft 314 which rotates in suitable journal assemblies 316 secured to the shelf 300. The pressure roll 312 is mounted on a shaft 318 which rotates in bearings in a slide 320 mounted for vertical movement in guideways provided in two plates 322 fixed to and depending from the shelf 300. The pressure roll 312 is positioned in contacting relation to the feed roll 294 by screws 324 mounted in a horizontal plate 326 secured to the lower extremities of the plates 322.

In the operation of the illustrated apparatus the pumps which feed the prepolymer and the catalyst to the mixing bowl 36 having been set in motion and the motor 30, which operates the mixing auger 20, having been started, the carrier 94 (FIG. 7) is set in motion by starting the motor 110 and the feeding movement of the conveyor belt 206 is started by initiating the operation of the pulley 308 (FIG. 9). The handle 72 (FIG. 1) having been operated to open the passage to the discharge port at the base of the mixing bowl 36, fluid is discharged from the bowl in a continuous stream as the bowl shuttles back and forth, traversing the conveyor belt widthwise thereof. The stream of fluid moves down along the flow rod 174 (FIG. 3) and into contact with the flow plate 178, flowing down the plate 178 in the form of a sheet of irregular thickness. The fluid sheet flows off the plate 178 onto the conveyor belt 206 which conducts it to the doctor bar 214. In the course of the movement of the fluid sheet beneath the doctor bar refluence of fluid on the ingress side of the doctor bar creates an accumulation or bank of material, identified in FIG. 3 by the numeral 328. The bank 328 has a rolling action in the direction of the arrow applied thereto in FIG. 3 which augments the mixing action commenced in the mixing bowl 36. The rollinw action of the bank is caused in part by the movement of the conveyor belt and the blow sheet, in part by inclination of the bottom surface of the doctor bar at the ingress side thereof and a similar inclination of a guide plate adjacent to the doctor bar, and in part by the viscous nature of the mixture. The presence of such a rolling bank of the mixture at the ingress side insures a uniform thickness of the mixture proceeding from the doctor bar and also insures the absence of entrapped air between the blow sheet and the upper surface of the fluid sheet. The rolling bank also causes a secondary mixing by interflow or intermingling of the fluid components sufficient to cause a final mixture of the components adequate to insure the ultimate formation of a uniform cellular structure. As shown herein the depth of the bank may be varied by one or more of the following adjustments: changing the speed of movement of the conveyor belt, adjusting the position of the flow plate, and making volumetric adjustment of the flow of fluid from the mixing bowl. The bank 328 should not be permitted to expand to a size in which any portion of the material comprising the bank is beyond the influence of the cooling plate 200 since, under these circumstances, gasification, or blowing action, might commence within the bank thus preventing the formation of a uniform cellular structure in the subsequent blowing action which commences after the fluid sheet has passed beyond the doctor bar 214. When the fluid sheet reaches the doctor bar it comes in contact with the blow sheet 280 and remains thereafter in intimate contact with the blow sheet as the assembly comprising the conveyor belt 206, the fluid sheet 290 and the blow sheet 280 proceed along the top of the table 184 and into and through the oven 292. The activation of the blowing agent occurs before the entrance of the assembly into the oven 292. During its passage through the oven the sheet 290 is sufficiently cured to permit it to be separated from the conveyor belt and the blow sheet after passing from the egress end of the oven 292 and to be wound upon a suitable roll. At the egress end of the table the blow sheet 280 and the plastic sheet 290 are elevated slightly into engagement with a guide roll 330 thus disengaging the plastic sheet from the conveyor belt 206 which proceeds in a horizontal path to the guide roll 310 passing downwardly around the guide roll and in a downwardly inclined path to the bottom of the feed roll 294. The roll 312 is so adjusted relatively to the feed roll that gripping pressure is exerted on the conveyor belt at the nip of the two rolls. After passing downwardly about the pressure roll 312 the conveyor belt is conducted in a generally horizontal path to a roll (not shown) on which it is rewound for re-use. The blow sheet 280 is conducted in an upwardly inclined path from the guide roll 330 to a roll (not shown) on which it, too, is rewound for re-use. The plastic sheet is conducted from the guide roll 330 in a path between the blow sheet and the conveyor belt to a roll (not shown) on which it is wound for shipment.

Having thus described our invention, what we claim as new and desire to secure by Letters Patent of the United States is:

1. In combination a dispenser of viscous fluid, means for mounting a conveyor sheet to receive fluid discharged from the dispenser, a doctor member for leveling the fluid deposited upon the conveyor sheet, means for cooling the doctor member, means for guiding a blow sheet beneath the doctor member to be cooled thereby and to cause the blow sheet to come into contact with the fluid on the conveyor sheet substantially at the region of operation of the doctor member, means mounting the doctor member and the guiding means for movement toward and from the conveyor belt, and means for effecting such movement of the mounting means.

2. In combination a dispenser of viscous fluid, a flow plate for receiving fluid from the dispenser, means for causing the dispenser to traverse the flow plate in a direction generally perpendicular to the direction of flow of fluid thereon, a flow rod mounted to move with the dispenser and positioned between the dispenser and the flow plate, means for cooling the flow plate, means for supporting a sheet beneath the flow plate for the reception of fluid flowing from said plate, a doctor member for leveling fluid received by the conveyor sheet, means for cooling the doctor member, a member for guiding a blow sheet for movement beneath the doctor member in a direction to bring it into contact with the fluid on the conveyor sheet at the region of operation of the doctor member to be cooled thereby, means mounting the doctor member and the guiding member for movement toward and from the conveyor sheet, and means for effecting such movement of the mounting means.

References Cited in the file of this patent

UNITED STATES PATENTS

| | | |
|---|---|---|
| 864,028 | Peters | Aug. 20, 1907 |
| 946,676 | Kurz | Jan. 18, 1910 |
| 1,157,149 | Conger | Oct. 19, 1915 |
| 1,807,223 | Miller | May 26, 1931 |
| 1,972,457 | O'Brien et al. | Sept. 4, 1934 |
| 2,221,367 | Bishop et al. | Nov. 12, 1940 |
| 2,292,760 | Kath | Aug. 11, 1942 |
| 2,293,174 | Ronney et al. | Aug. 18, 1942 |
| 2,295,394 | Fordyce et al. | Sept. 8, 1942 |
| 2,320,341 | Bowes | June 1, 1943 |
| 2,322,827 | Carver | June 29, 1943 |
| 2,404,582 | Bosomworth | July 23, 1946 |
| 2,500,728 | Williams | Mar. 14, 1950 |
| 2,510,966 | Flanagan | June 13, 1950 |
| 2,590,186 | Land | Mar. 25, 1952 |
| 2,712,154 | Lindquist | July 5, 1955 |
| 2,717,474 | Barradell-Smith | Sept. 13, 1955 |
| 2,764,565 | Hoppe et al. | Sept. 25, 1956 |
| 2,795,207 | Mario | June 11, 1957 |
| 2,899,704 | Pekarek | Aug. 18, 1959 |

FOREIGN PATENTS

| | | |
|---|---|---|
| 414,535 | Great Briatin | Aug. 9, 1934 |